(12) United States Patent
Watson (10) Patent No.: US 7,728,961 B2
(45) Date of Patent: Jun. 1, 2010

(54) SURFACE HEIGHT AND FOCUS SENSOR (75) Inventor: Mathew David Watson, Bellevue, WA (US)

(73) Assignee: Mitutoyo Coporation, Kawasaki-shi (JP)

( * ) Notice: Subject to any disclaimer, the term of this patent is extended or adjusted under 35 U.S.C. 154(b) by 495 days.

(21) Appl. No.: 11/689,416

(22) Filed: Mar. 21, 2007

(65) Prior Publication Data

US 2008/0100829 A1 May 1, 2008

Related U.S. Application Data

(63) Continuation-in-part of application No. 11/590,964, filed on Oct. 31, 2006, now abandoned.

(51) Int. Cl.
*G01J 1/00* (2006.01)
(52) U.S. Cl. ..................................................... 356/123
(58) Field of Classification Search .................. 356/123
See application file for complete search history.

(56) References Cited

U.S. PATENT DOCUMENTS

| 3,161,718 | A | 12/1964 | De Luca |
| 4,336,997 | A | 6/1982 | Ross |
| 4,950,878 | A | 8/1990 | Ulich |
| 5,055,663 | A | 10/1991 | Morimoto |
| 5,113,386 | A | 5/1992 | Whitehead |
| 5,283,681 | A | 2/1994 | Hoshino |
| 5,973,852 | A | 10/1999 | Task |
| 6,184,974 | B1 | 2/2001 | Neal |
| 6,369,954 | B1 | 4/2002 | Berge |
| 6,541,747 | B1 | 4/2003 | Kikuchi |
| 6,550,917 | B1 | 4/2003 | Neal |
| 6,618,209 | B2 | 9/2003 | Nishioka |
| 6,631,020 | B2 | 10/2003 | Paris |
| 6,750,436 | B2 | 6/2004 | Feldman |
| 6,897,421 | B2 | 5/2005 | Gelman |
| 7,016,525 | B2 | 3/2006 | Gladnick |

(Continued)

FOREIGN PATENT DOCUMENTS

DE 4335249 A1 4/1994

(Continued)

OTHER PUBLICATIONS

Feldman, U.S. Appl. No. 11/386,846, filed Feb. 23, 2006.

(Continued)

*Primary Examiner*—Kara E Geisel
(74) *Attorney, Agent, or Firm*—Christensen O'Connor Johnson Kindness PLLC (57) ABSTRACT

A surface height and focus sensing system is provided. In one embodiment, an illumination focus sensor is used in combination with a collimation adjustment element which drives the system such that an illumination focus height matches the workpiece surface height, which produces a null output from the illumination focus sensor. Under the null condition, the amount of collimation adjustment is directly related to the workpiece surface height, and the resulting height determination is relatively insensitive to the workpiece surface optical properties. In one embodiment, the amount of collimation adjustment is determined according to the control signal for the collimation adjustment element. In another embodiment, a collimation adjustment sensor is utilized to measure the amount of collimation adjustment.

15 Claims, 7 Drawing Sheets

U.S. PATENT DOCUMENTS

| | | |
|---|---|---|
| 7,071,451 B2 | 7/2006 | Ishikawa |
| 7,348,528 B2 | 3/2008 | Marshall |
| 2003/0098967 A1 | 5/2003 | Christoph |
| 2004/0008419 A1 | 1/2004 | Schachar |
| 2004/0263783 A1 | 12/2004 | Neal |
| 2008/0100850 A1 | 5/2008 | Watson |

FOREIGN PATENT DOCUMENTS

| | | |
|---|---|---|
| JP | 5-164556 | 6/1993 |

OTHER PUBLICATIONS

Kerr, T., "Telescope Focus," Nov. 7, 2004, <http://www.jach.hawaii.edu/UKIRT/telescope/focus.html>.

QVPAK 3D CNC Vision Measuring Machine Operation Guide, Version 2.0, Manual No. 4911GB, Series No. 359, Mitutoyo Corporation & Micro Encoder Inc., Kanagawa, Japan, Sep. 1996.

QVPAK 3D CNC Vision Measuring Machine User's Guide, Version 7.0, 1st ed., Manual No. 99MCB225A1, Series No. 359, Mitutoyo Corporation & Micro Encoder Inc., Kanagawa, Japan, Jan. 2003.

European Examination Report mailed Nov. 6, 2008, issued in corresponding Application No. 08005386.1, filed Mar. 20, 2008.

SURFACE HEIGHT AND FOCUS SENSOR

CROSS-REFERENCE(S) TO RELATED APPLICATION(S)

This application is a continuation-in-part of U.S. patent application Ser. No. 11/590,964, filed Oct. 31, 2006, priority from the filing date of which is hereby claimed under 35 U.S.C. §120.

FIELD OF THE INVENTION

The invention relates generally to metrology systems, and more particularly to a surface height and focus sensor that may be utilized as part of a machine vision inspection system.

BACKGROUND OF THE INVENTION

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the *QVPAK 3D CNC Vision Measuring Machine User's Guide*, published January 2003, and the *QVPAK 3D CNC Vision Measuring Machine Operation Guide*, published September 1996, each of which is hereby incorporated by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

In traditional machine vision inspection systems (such as the QUICK VISION® series of vision systems described above), when it is desired to determine a surface height, or an image is out of focus, the system may run an autofocus process. One traditional autofocus process involves a relatively time consuming process consisting of acquiring a series of images at known camera positions (relative to a machine coordinate system), computing image focus characteristics (e.g. image contrast) for each acquired image, and finding the best focus position based on the known distances and focus characteristics of the images. To provide a focused image, the system may be moved to the determined best focus position. Also, a surface height measurement may be inferred from the best focus position, since the camera-object distance corresponding to the best image focus is generally known based on system design or calibration.

It is also known to use auxiliary focus sensors, that is focus sensors that do not rely on the images of the machine vision inspection system for determining the best focus position or surface height. Various types of focus sensors including triangulation sensors, knife edge focus sensors, chromatic confocal sensors, and the like, have been used. However, such auxiliary sensors have exhibited drawbacks such as failing to work reliably with both specular and diffuse surfaces, and/or undesirable range vs. resolution capabilities, and/or undesirable optical or control system complexity, and/or lack of lateral resolution, and/or lack of simple registration of the focal spot within the field of view of an image.

One sensitive focus sensing technique that has been used in telescope systems utilizes Shack-Hartmann wavefront sensors, as described in an article accessible at http://www.jach.hawaii.edu/UKIRT/telescope/focus.html. However, teachings related to the use of Shack-Hartmann wavefront sensors in telescope systems do not address issues that are critical for general-purpose machine vision inspection systems or auxiliary sensors such as those outlined above. In particular, issues related to workpiece surface height measurement, workpiece surface properties, non-collimated artificial illumination, and the like, do not arise in telescope applications. One metrology application that utilizes a Shack-Hartmann type of wavefront sensing technique is described in U.S. Pat. No. 6,184,974, to Neal et al., which is hereby incorporated by reference in its entirety. As described in the '974 patent, the minute deviations of a surface from perfect flatness, such as the surface of a silicon wafer, etc., may be measured by reflecting appropriate illumination from the surface and directing it to a Shack-Hartmann wavefront sensor that includes a plurality of sub-apertures. In particular, a plurality of lenslets arranged in an array are used to sample the wavefront. Each lenslet provides a corresponding sub-aperture. The resulting array of spots, which may be interpreted as a physical realization of an optical ray trace, are focused onto a detector. The position of the focal spot from a given sub-aperture is dependent upon the average wavefront slope over the sub-aperture. The direction of propagation, or wavefront slope, of each of the samples is determined by estimating the focal spot position shift from nominal for each lenslet. The wavefront sensor and the object are translated relative to one another to measure the wavefronts at a plurality of subregions of the object. The subregions may overlap in at least one dimension. The measured wavefronts are then stitched together to form a wavefront of the object. The wavefront and/or surface slope profile and/or relative surface height profile may then be reconstructed from the detected images in a number of known manners. The resolution and sensitivity of the sensor are determined by the lenslet array. However, while the '974 system is able to precisely measure surface flatness of wafers and the like, it fails to address issues that are critical for many of the focusing and measuring operations performed by general-purpose machine vision inspection systems. In particular, issues related to abrupt surface height steps, unpredictable workpiece surface properties, workpiece surface height measurement over larger ranges, and the like, are not adequately addressed.

The present invention is directed to a sensor that overcomes the foregoing and other disadvantages. More specifically, the present invention is directed to a surface height and focus sensor configuration that is of particular utility in a general purpose machine vision inspection system for performing precision dimensional metrology.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A surface height and focus sensing system and method are provided. In accordance with one aspect of the invention, an illumination focus sensor, which may comprise a wavefront or collimation sensor or an axial focus location sensor, is used to detect a difference between the location of an illumination focus height and the location of a portion of a workpiece surface that is proximate to the illumination focus height. In various embodiments, this technique is used in combination with a collimation adjustment element which drives the system such that the illumination focus height matches the workpiece surface height, which produces a null output from the illumination focus sensor. In various embodiments, this may be done without altering the nominal positions of the sensing system components or the workpiece surface. Under the null condition, the amount of collimation adjustment is directly related to the workpiece surface height, and the resulting surface height determination is relatively insensitive to the workpiece surface optical properties. By determining the surface height without altering the positions of the sensing system components or the workpiece surface, relatively fast measurement and/or focus operations may be provided. In various embodiments, the illumination focus sensor may be a Shack-Hartmann type wavefront sensor.

In accordance with another aspect of the invention, in one embodiment, the amount of adjustment provided by the collimation adjustment element (which corresponds to the adjustment in the illumination focus height) is utilized as an indication of the height of the workpiece surface that receives the focused illumination. In one embodiment, the amount of adjustment is determined based on the control signal for the collimation adjustment element. In another embodiment, a collimation adjustment sensor, which may comprise a wavefront or collimation sensor or an axial focus location sensor, is utilized to measure the amount of collimation adjustment. By utilizing the amount of collimation adjustment that corresponds to a null output from the illumination focus sensor as an indication of the surface height (as opposed to measuring the changes in the sensor output, which may be affected by the surface properties of the measured surface), the system is made to be relatively insensitive to the surface properties of the measured surface. That is, the height measurements will be consistent regardless of whether the surface is specular, diffuse, etc.) In various embodiments, the collimation adjustment sensor may be a Shack-Hartmann type wavefront sensor.

In accordance with another aspect of the invention, a method is provided for operating a surface height sensing system for detecting a location of a portion of a workpiece surface along a direction approximately parallel to the optical axis of an objective lens. In various embodiments, the method may comprise: outputting a workpiece illuminating beam from a light source; providing the workpiece illumination beam with a controllable degree of collimation; inputting light from the workpiece illuminating beam having the controllable degree of collimation to the objective lens; outputting the light from the workpiece illuminating beam from the objective lens such that it is focused at an illumination focus height proximate to the portion of the workpiece surface; inputting reflected workpiece illuminating beam light from the workpiece surface to the objective lens, and transmitting the reflected light through the objective lens to provide a focus-detection light beam; inputting the focus detection light beam to an illumination focus sensor, and operating the illumination focus sensor to provide at least one output signal that depends on a characteristic of the input focus detection light beam that depends at least partially on a difference between the location of the illumination focus height and the location of the proximate portion of the workpiece surface; and performing operations that detect the location of the proximate portion of the workpiece surface along a direction approximately parallel to the optical axis of the objective lens, wherein the operations that detect the location of the proximate portion of the workpiece surface comprise adjusting the controllable degree of collimation provided to the workpiece illumination beam until the at least one output signal from the illumination focus sensor corresponds to the location of the illumination focus height approximately coinciding with the location of the proximate portion of the workpiece surface.

According to a further aspect of the invention, in various embodiments, operating at least one of the illumination focus sensor and the collimation adjustment sensor may comprise operating a wavefront sensor to sample a local ray angle at a corresponding region along a wavefront of an input light beam to provide a corresponding detection signal that depends on the sampled local ray angle. When a single local ray angle is sampled, a relationship including the corresponding detection signal and a reference signal value corresponding to a reference amount of wavefront curvature, may indicate a degree of wavefront curvature of the input focus detection light beam. According to a further aspect of the invention, in various embodiments, operating at least one of the illumination focus sensor and the collimation adjustment sensor may comprise operating a wavefront sensor to sample at least two local ray angles at separated regions along a wavefront of the input focus detection light beam to provide at least two detection signals, wherein a relationship including the at least two detector signals corresponds to a degree of wavefront curvature of the input focus detection light beam.

It will be appreciated that in various embodiments the foregoing method may be used to detect the location of the proximate portion of the workpiece surface explicitly or implicitly. That is, in some embodiments, a location coordinate of the proximate portion of the workpiece surface may be determined relative to some frame of reference (explicit location detection). In other embodiments, it may simply be detected that the proximate portion of the workpiece surface coincides with a certain location such as the location of the illumination focus height (implicit location detection).

In some embodiments, the method is implemented in a sensing system that is included in a precision machine vision inspection system. In some embodiments, the precision machine vision inspection system may comprise an imaging system including the objective lens and a camera, and the imaging system and a surface height and focus sensing system according to this invention may share the same objective lens. In such embodiments, the proximate portion of the workpiece surface may be positioned in the field of view of the imaging system; and the shared objective lens may also be used for providing workpiece inspection images. It will be appreciated that in such embodiments the present invention may be applied for either direct surface height measurement (e.g. at a micron or sub-micron resolution level over a range of approximately a few millimeters), or for providing an indication of a best focus position such that a machine vision inspection system may be moved to that position as part of an autofocus process, or for both purposes.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
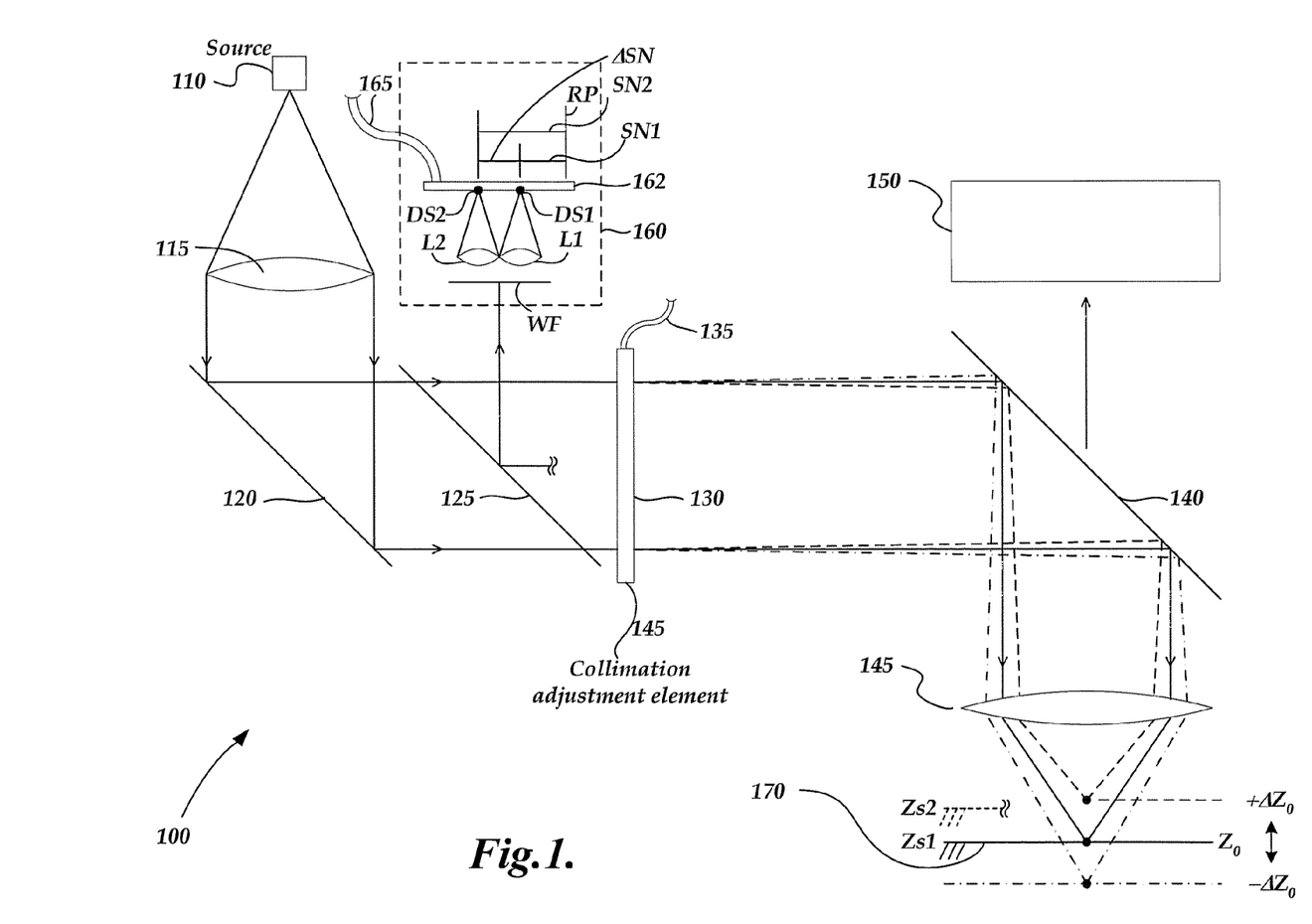
FIG. 1 is a diagram of a first embodiment of a surface height and focus sensor which utilizes a collimation adjustment element and a wavefront sensor.

FIG. 1 is a diagram of a first embodiment of a surface height and focus sensor 100, formed in accordance with the present invention. The sensor 100 includes an illumination source 110, a collimating lens 115, a mirror 120, a beamsplitter 125, a collimation adjustment element 130, a beamsplitter 140, an objective lens 145, and a wavefront sensor 160. Also shown in FIG. 1 are a camera 150, and a workpiece surface 170. In one embodiment, the objective lens 145 and the camera 150 may be components that are normally included in a machine vision inspection system, and the surface height and focus sensor 100 is integrated with the machine vision inspection system. In various embodiments, an associated signal processing and control system (not shown), may be included with the sensor 100, or provided as part of host system (e.g. a machine vision inspection system), in order to process various signals, and/or perform various control operations, as outlined in the following description.

In one embodiment, the illumination source 110 provides light which passes through the collimating lens 115 to provide some degree of collimation to an illuminating beam that is reflected by the mirror 120 toward the beamsplitter 125. It will be appreciated that the illumination source 110 may utilize any operable wavelength of radiation (e.g. in one embodiment, as described in more detail below, it may be desirable to operate in an invisible spectrum or else provide a strobed configuration so that the image of the workpiece surface at the camera 150 is not affected for conventional imaging and/or other surface measurement operations.) The illuminating beam from the mirror 120 passes through the beamsplitter 125 to the collimation adjustment element 130. As will be described in more detail below, the collimation adjustment element 130 may be utilized to provide an amount of collimation adjustment to the illuminating beam, to drive the system such that the wavefront sensor 160 outputs a null (or near-null) output (i.e. when the illumination focus height matches the surface height.) In one embodiment, the collimation adjustment element 130 is a variable focus lens that is electronically adjustable so that the system can be driven to the null state without requiring changing the relative positions of the components of the system, or the workpiece surface 170. Such a configuration allows measurements to be made more quickly than in prior systems which utilize relatively slower mechanical position adjustments to determine the height of the workpiece surface 170 and/or the proper focus for the system.

In various embodiments, the collimation adjustment element 130 can include any device having a focal length that can be controllably varied. Various examples of such devices are described in copending U.S. patent application Ser. No. 11/386,846 to Feldman, filed Feb. 23, 2006, which is commonly assigned and hereby incorporated by reference in its entirety. Such variable focal length devices may include a variable focal length lens, such as a zoom lens, or a controllable lens based on electrowetting technology (such as a Varioptic lens available from Varioptic of Lyon, France, or a FluidFocus lens available through Philips Research of Royal Philips Electronics, Amsterdam, The Netherlands, etc.), or pressure-controlled lens technology, or deformable mirror technology, or the like. Variable focal length lenses that are based on the electrowetting phenomenon typically consist of two hermetically sealed immiscible liquids, matched in density, but with different conductivities and indices of refraction, that are deposited on a metal substrate covered by a thin insulating layer. Applying a voltage to the substrate modifies the curvature of the meniscus of the liquid-liquid interface, which in turn changes the focal length of the lens. One example of such a lens is described in U.S. Pat. No. 6,369,954 to Berge and Peseux, which is incorporated herein by reference in its entirety. Pressure-controlled variable focal length lenses utilize physical pressure to change the shape of a surface, which in turn changes the focal length of the lens. Such lenses are described in U.S. Pat. Nos. 5,973,852 to Task, and 3,161,718 to De Luca, both of which are incorporated herein by reference in their entirety.

In another embodiment, a variable focal length optical assembly, including a variable focal length reflector such as a deformable mirror or a micro-mirror array, may be utilized. For example, the principles and design of electrostatically controlled reflective membrane devices are described in U.S. Pat. No. 6,618,209 to Nishioka, et al., which is hereby incorporated by reference in its entirety. As another example, a variable focal length reflector can include a pressure controlled reflective membrane. The principles and design of pressure controlled reflective membrane devices are described in U.S. Pat. No. 6,631,020 to Paris and Rouannet, which is hereby incorporated by reference in its entirety. It should be appreciated that if a reflective-type of variable focal length device is used for the collimation adjustment element 130, that such a collimation adjustment element may include a plurality of optical elements and relatively complex internal optical path, and/or a modification of the optical path shown in FIG. 1. However, the basic teachings disclosed herein may still be applied when using a reflective-type of variable focal length device as the collimation adjustment element 130.

Returning to FIG. 1, the illuminating beam is output from the collimation adjustment element 130 with an amount of collimation adjustment that provides a desired degree of collimation for the illuminating beam, and it is directed by the beamsplitter 140 to the objective lens 145, from which it is focused at an illumination focus height in proximity to the workpiece surface 170. The illumination focus height is determined in part by the objective lens 145 and in part by the degree of collimation of the illuminating beam after it has passed through the collimation adjustment element 130. In operation, the collimation adjustment control signal on the control line or bus 135 drives the collimation adjustment element 130 to change its focal length, which changes the focusing height of the resulting illumination spot relative to the workpiece surface 170, as will be described in more detail below. With regard to the configuration of FIG. 1, according to a convention used herein, if the illuminating beam output from the collimation adjustment element 130 is collimated (as indicated by the rays shown as solid lines in FIG. 1), the illumination focus height is at its nominal position $Z_0$.

Illumination light that is reflected from the workpiece surface travels back through the objective lens 145 and to the beam splitter 140. A first portion of the reflected illumination light from the objective lens 145, as well as other light that may be used to provide a conventional image of the workpiece surface 170, is transmitted through the beamsplitter 140 to the camera 150, such that an image is formed of the workpiece surface 170 and traditional imaging and measurement operations may be performed. In various embodiments, the focused illumination spot may be included in such images, such that its X-Y position on the surface 170 may be determined from the image. In various other embodiments, light from the focused illumination spot may be eliminated at the camera 150 by using light that is invisible to or filtered from the camera system, or by operating the camera 150 at times when the illumination spot is turned off. A second portion of the reflected illumination light from the objective lens 145, which is the portion that operable for the purposes of surface height and focus sensing, is reflected by the beamsplitter 140 back through the collimation adjustment element 130 to the beamsplitter 125, where it is reflected to be input to an illumination focus sensor, which in the embodiment illustrated in FIG. 1 is a wavefront sensor 160.

In general, a wavefront sensor, as the term is used herein, may be described as sampling at least one local ray angle at a corresponding region along a wavefront of an input light beam to provide at least one corresponding detection signal that depends on the sampled local ray angle. Generally, it is desirable to sample at least two respective local ray angles at two respective corresponding regions that are separated along the wavefront of the input light beam, to provide at least two respective detection signals that depend on the sampled local ray angles. A relationship including the at least two detector signals corresponds to a degree of wavefront curvature of the input focus detection light beam, and the effects of wavefront tilt (as opposed to wavefront curvature) may be detected and rejected as a common mode error that is present in each of the at least two detector signals.

However, it is also possible to indicate a degree of wavefront curvature based on sampling a single local ray angle at a single fixed-location region along the wavefront of the input light beam, provided that two conditions are fulfilled. The first condition is that a reference signal corresponding to a "reference amount" of wavefront curvature must be known for that fixed location along the wavefront of the input light beam. The second condition is that the tilt of the input light beam must remain stable, because one cannot tell a curvature change from a tilt change when using a single signal from a single sampling region. Provided that these conditions are fulfilled, a single detector may be used in a wavefront sensor according to this invention. In such a case, the reference signal corresponding to the "reference amount" of wavefront curvature will correspond to the null signal and/or null condition referred to elsewhere in this disclosure.

In one embodiment, the wavefront sensor 160 may include a Shack-Hartmann sensor. The wavefront sensor 160 may include lenses L1 and L2 and a photo detector 162 with a signal and control line 165. In one embodiment, the lenses L1 and L2 may be micro-lenses. The lenses L1 and L2 each focus the light input from the beamsplitter 125, the input light having a wavefront schematically represented by the wavefront WF in FIG. 1. The lenses L1 and L2 produce images that appear as detection spots DS 1 and DS2, respectively, on the photo detector 162. In one embodiment, the photo detector 162 may comprise a pair of lateral affect photodiodes (one for each detection spot). In another embodiment, the photo detector 162 may comprise a photodetector array, such as a camera chip, or the like. In any case, the detection spots DS1 and DS2 are at distances SN1 and SN2, respectively, from a reference position RP along the surface of the photo detector 162. The difference between the distances SN1 and SN2 is designated as a distance ΔSN. It will be appreciated that the reference position RP from which the distances SN1 and SN2 are measured may be arbitrarily selected. In one embodiment, the reference position RP may be designated in accordance with the edge of the photo detector 162. It will also be appreciated that when the photo detector 162 is an array detector, the detection spots DS1 and DS2 may each cover several pixels, in which case a centroid calculation, which may provide sub-pixel position interpolation, may be performed to determine the location of each detection spot.

As will be described in more detail below, in the illustration of FIG. 1 the wavefront WF is illustrated as being flat, which corresponds to an "in focus" configuration, meaning that the illumination focus height matches the height of the workpiece surface 170. When the system is properly focused on the workpiece surface (i.e. the illumination focus height matches the workpiece surface height), the wavefront WF is flat, and the detection spots DS1 and DS2 appear at nominal positions $SN1_0$ and $SN2_0$ aligned with the optical axes of the corresponding individual lenses, and the difference measurement has a nominal value of $\Delta SN_0$. In other words, according to a convention used herein, the nominal positions $SN1_0$ and $SN2_0$ and the difference measurement $\Delta SN_0$ correspond to the positions of the detection spots DS1 and DS2 when the illumination focus height matches the workpiece surface height. FIG. 1 shows one example of this, where the workpiece surface height. $Z_S1$ coincides with the nominal illumination focus height $Z_0$. As will be described in more detail below, when the system is not properly focused on a surface (e.g. as illustrated by a workpiece surface shown in dashed outline at a height $Z_S2$ in FIG. 1) then the detection spots DS1 and DS2 will appear at positions SN1 and SN2 which are other than their nominal positions $SN1_0$ and $SN2_0$. As the collimation adjustment element 130 is adjusted such that the illumination focus height is adjusted by an amount $\Delta Z_0$ that moves the illumination focus spot back into coincidence with the workpiece surface, then the detection spots DS1 and DS2 will move back to their nominal positions $SN1_0$ and $SN2_0$.

During operation of the wavefront sensor 160, as is known for the use of Shack-Hartmann sensors, when the wavefront WF is not flat, the positions of the detection spots DS1 and DS2 appear at positions SN1 and SN2 on the photo detector 162 other than at their nominal positions $SN1_0$ and $SN2_0$. In general, the wavefront WF is not flat when the illumination focus height deviates from the height of the workpiece surface 170. For example, in one embodiment, the overall optical axis of the wavefront sensor 160 is nominally centered between the lenses L1 and L2, and parallel to their individual optical axes. In such a case, if the distance SN1 is smaller than $SN1_0$ and the distance SN2 is larger than $SN2_0$, such that the corresponding difference measurement $\Delta SN$ is larger than $\Delta SN_0$, then this corresponds to the illumination focus height being above the height of the workpiece surface 170. Conversely, if the detection spots DS1 and DS2 appear closer such that the difference measurement $\Delta SN$ is smaller than $\Delta SN_0$, then this corresponds to the illumination focus height being below the workpiece surface height.

According to one aspect of this invention, when the difference measurement $\Delta SN$ is other than its nominal value $\Delta SN_0$, the collimation adjustment element 130 is used to adjust collimation of the illumination beam such that $\Delta SN$ nominally equals $\Delta SN_0$, which corresponds to the illumination focus height matching the height of the workpiece surface 170. For example, for the configuration described above with reference to FIG. 1, if the detection spots DS1 and DS2 appear at positions further apart than their nominal positions, then the collimation adjustment element 130 is electronically adjusted to alter the collimation of the illumination beam such that it raises the illumination focus height to match the height of the workpiece surface 170. Conversely, if the detection spots DS1 and DS2 appear at positions closer together than their nominal positions, then the collimation adjustment element 130 is electronically adjusted to alter the collimation of the illumination beam such that it lowers the illumination focus height to match the height of the workpiece surface 170, and thereby bring the detection spots DS1 and DS2 to their nominal positions. In either case, the light reflected from a properly focused illumination spot will return through the objective lens 145 and the along a reverse path through the collimation adjustment element 130, such that it will enter the wavefront sensor 160 with nominally the same degree of collimation as the light that originates from the collimation lens 115, which is nominally a fixed degree of collimation corresponding to $\Delta SN_0$. In various embodiments, the light that originates from the collimation lens 115 is nominally fully collimated, corresponding to the wavefront WF being a flat wavefront. In various other embodiments, the light that originates from the collimation lens 115 may slightly diverging or converging, and the resulting effects of the imperfect collimation may be accounted for in the calibration and signal processing that is used to analyze the detection spots DS1 and DS2 in the wavefront sensor 160. However, for simplicity and clarity of explanation, it is hereafter assumed that the light that originates from the collimation lens 115 is fully collimated, corresponding to a flat wavefront WF when the illumination focus height matches the height of the workpiece surface 170.

According to the foregoing description, the amount that the illumination focus height is adjusted from its nominal position $Z_0$, in order to provide an output corresponding to $\Delta SN_0$, provides an indication of the current height of the workpiece surface relative to the nominal position $Z_0$. Thus, by knowing the amount of collimation adjustment, (e.g., in one embodiment by measuring the control signal for the collimation adjustment element 130) and its relationship to the corresponding amount of adjustment of the illumination focus height, the current height of the workpiece surface 170 may be determined. The following equations provide an example of how the height of the workpiece surface 170 may be calculated.

As illustrated in FIG. 1, the actual height of the surface of the workpiece is generally expressed by the value $Z_s$ (specific instances $Z_s1$ and $Z_s2$ are illustrated in FIG. 1). The uncorrected or nominal illumination focus height is expressed by the value $Z_0$. This may be advantageously designed to match the inspection camera 150 image focus height in various embodiments. The change in the illumination focus height brought about by a Collimation Adjustment Signal CAS is expressed by a function $\Delta Z_0(CAS)$. This function is related to the general illumination spot focus height by the following equation:

$$\text{Illumination Spot Focus Height} = Z_0 + \Delta Z_0(CAS) \quad \text{(Eq. 1)}$$

An illumination Focus Deviation FD between the actual surface height and the illumination spot focus height is given by the expression:

$$FD = Z_s - (\Delta Z_0 + \Delta Z_0(CAS)) \quad \text{(Eq. 2)}$$

This corresponds to the actual surface height minus the illumination spot focus height. For the situation in which FD=0, that is, when the illumination spot is properly focused at the workpiece surface, we thus have:

$$Z_s = Z_0 + \Delta Z_0(CAS) \quad \text{(Eq. 3)}$$

As shown in FIG. 1, assuming symmetrical construction of the detection spot sensing configuration about the optical axis of the input beam, the values SN1 and SN2 are given by the expressions:

$$SN1 = SN1_0 + f(FD, SP)$$

$$SN2 = SN2_0 - f(FD, SP) \quad \text{(Eqs. 4, 5)}$$

where $SN1_0$ and $SN2_0$ correspond to the positions of the detection spots DS1 and DS2 (that is, the location of their centroids) behind the two detector lenses L1 and L2 when FD=0, and SP stands for the optical Surface Properties SP of the workpiece surface 170.

The function $f$, indicating the location of the detection spot on the detector, is a function that depends on the illumination Focus Deviation FD and the optical Surface Properties SP of the workpiece surface 170, and is otherwise determined by design factors related to the overall optical configuration of the system. The effects of the optical Surface Properties SP of the workpiece surface 170 on the detection spots DS1 and DS2 is discussed in greater detail below.

Figure 2:
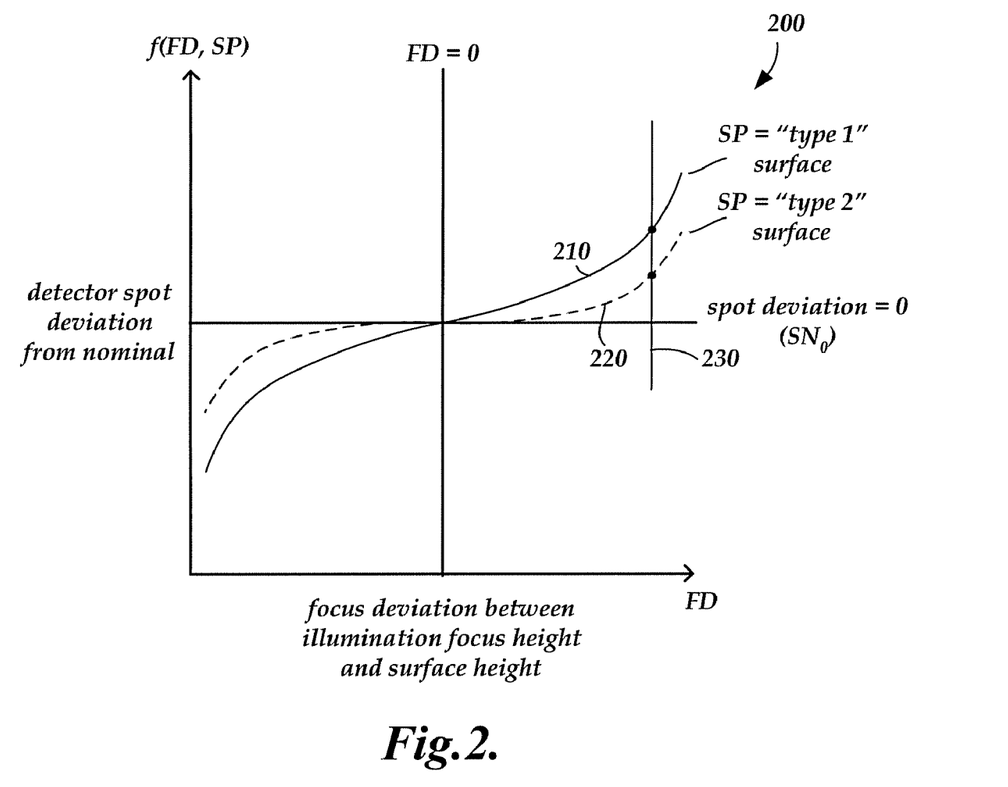
FIG. 2 is a graph illustrating signal outputs from a wavefront sensor which vary in accordance with both height and surface properties of a workpiece surface.

Based on the foregoing equations, the deviation from the nominal distance between the detection spot positions corresponding to the two lenses is given by the expression:

$$\Delta SN = SN1 - SN2 = \Delta SN_0 + 2f(FD, SP) \quad \text{(Eq. 6)}$$

where $\Delta SN_0$ is the distance between the detection spot positions corresponding to the two lenses when the workpiece surface is at the illumination focus height (FD=0). As will be described in more detail below with respect to FIG. 2, when the illumination spot is properly focused (i.e. FD=0), then the detection spot DS1 (and/or DS2) will be at its nominal position (i.e., $f(FD,SP)=0$), regardless of the surface properties SP of the workpiece surface. Therefore, when the system is in focus (i.e. FD=0) then $Z_s$ may be deduced from the value of the collimation adjustment control signal CAS that produces the corresponding condition $\Delta SN = \Delta SN_0$.

FIG. 2 is a graph 200 representing the deviation of a detector spot from its nominal position, for the wavefront sensor 160 of FIG. 1. As will be described in more detail below, the deviation of a detector spot may vary in dependence both upon the difference in height between the illumination focus spot and the workpiece surface and upon the optical surface properties of a workpiece surface. As shown in FIG. 2, the detection spot deviation from its nominal position $SN_0$ is plotted relative to the difference between the illumination focus height and the workplace surface height (i.e., the focus deviation FD). A graph line 210 corresponds to a workpiece surface with a first type of optical surface property SP (e.g. a smooth reflective surface), while a graph line 220 corresponds to a workpiece surface with a second type of optical surface property SP (e.g. a partially diffuse or rough surface).

As illustrated in FIG. 2, the line 210 that corresponds to the first type of surface generally indicates greater detection spot deviation for a given focus deviation FD than the line 220 that corresponds to the second type of optical surface. For example, at the level of focus deviation FD corresponding to the vertical line 230, the data point for the line 210 is shown to be higher than the data point for the line 220 and thus indicates greater detection spot deviation for the first type of optical surface than for the second type of optical surface. As one example, this might occur when the first type of surface is a specular workpiece surface, such that the detector spot will be relatively well focused. In comparison, if the second type of surface is a more diffuse workpiece surface, the detector spot will exhibit relatively more blur, and its detected deviation (e.g. its detected centroid location) for a given illumination focus deviation may be somewhat less. FIG. 2 qualitatively reflects such behavior. This behavior may be easier to appreciate by considering a limiting case, wherein if the workpiece surface is of a diffuse type and the illumination defocus at the workpiece surface is severe enough, the detector spot may become so blurred that its location cannot be determined accurately and/or the detector output does not change significantly with additional defocus.

FIG. 2 illustrates an important aspect of the present invention. More specifically, because surfaces with different optical surface properties SP (e.g. specular, diffuse, etc.) may have different curves corresponding to different detection spot deviations versus their focus deviations, unless the exact type of surface property SP is known, a simple measurement of the detection spot deviation will not provide an accurate indication of the present illumination focus deviation. However, as shown in FIG. 2, when the illumination spot is focused at the workpiece surface height, the detection spot deviation curves represented by lines 210 and 220 coincide. That is, in various embodiments according to this invention, regardless of the surface properties, when a detector spot is at $SN_0$, the workpiece surface is at $Z_0$. Thus, in various embodiments according to this invention, as a basis for measuring the height of the workpiece surface, the collimation adjustment element 130 is adjusted such that this condition is fulfilled. The resulting surface height measurement is nominally independent of the workpiece surface optical properties. As will be described in more detail below with respect to FIG. 3, a measurement of the change in the collimation adjustment element 130 required to make the illumination focus height match the surface height may provide an indication of the change $\Delta Z_0$ in the illumination focus height relative to its nominal position $Z_0$. Thus, that same measurement can be utilized as a measurement of the workpiece surface variation from the position $Z_0$, and the measurement will be nominally independent of the optical surface properties SP of the surface being measured, as outlined above.

Figure 3:
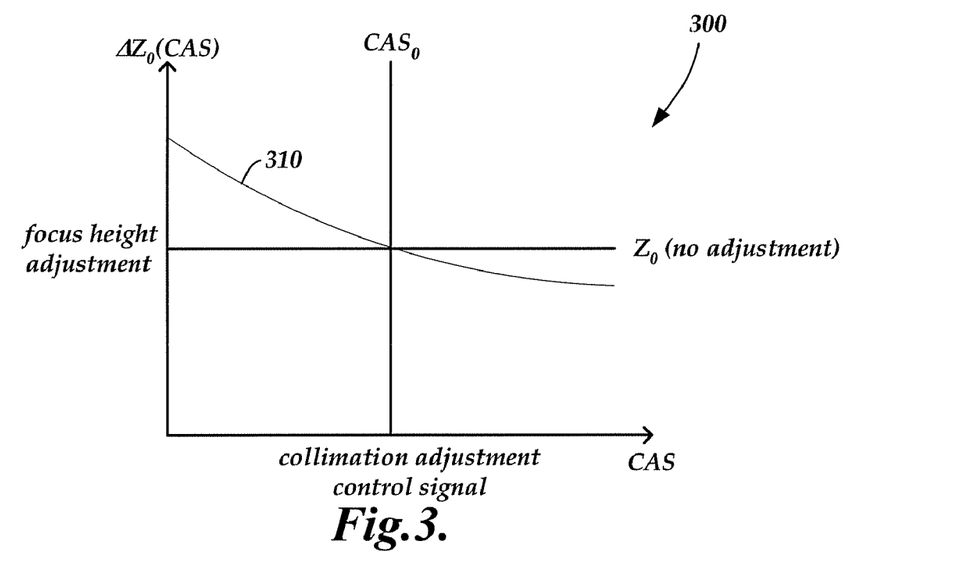
FIG. 3 is a graph illustrating a control signal for a collimation adjustment element which is used to adjust an illumination focus height.

FIG. 3 is a graph 300 showing a line 310 that plots the illumination focus height adjustment that results from a changing collimation adjustment control signal CAS. As described above with reference to EQUATION 1, the change in the focus height adjustment $\Delta Z_0$ is a function of the collimation adjustment control signal CAS, corresponding to the function $\Delta Z_0(CAS)$. In accordance with the present invention, once the line 310 is known, e.g. by design or calibration, by monitoring the collimation adjustment control signal CAS, an accurate indication can be provided of the focus height adjustment $\Delta Z_0$, which according to previously described principles corresponds to the present height of the surface that is being measured. In various embodiments, the surface height and focus sensor 100 may be designed such that the relationship between $\Delta Z_0$ and CAS is stable, and the value of CAS can be determined with a resolution that is sufficient to provide a desired measurement resolution for $\Delta Z_0$. In such embodiments, a measurement of the collimation adjustment control signal CAS may provide enough accuracy for a desired surface height measurement. However, in various other embodiments, a collimation adjustment sensor may be utilized to provide a more accurate measurement of the amount of collimation adjustment.

Figure 4:
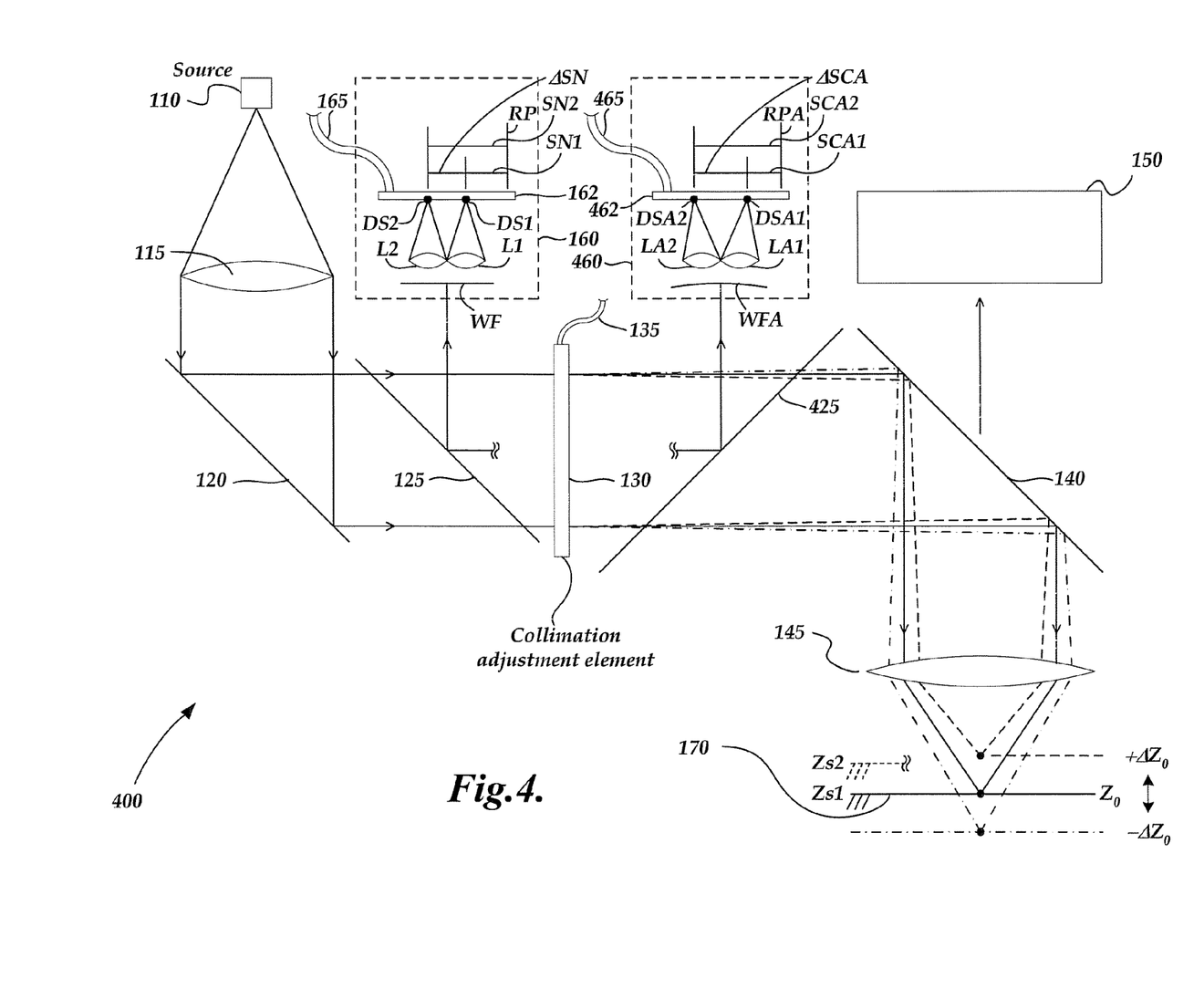
FIG. 4 is a diagram of a second embodiment of a surface height and focus sensor which includes a second wavefront sensor that can precisely sense an amount of collimation adjustment.

FIG. 4 is a diagram of a second embodiment of a surface height and focus sensor 400, formed in accordance with the present invention. The sensor 400 includes a collimation adjustment sensor, which in the embodiment shown in FIG. 4 is a second wavefront sensor 460 that can precisely sense the amount of collimation adjustment provided by the collimation adjustment element 130. The components and operation of the sensor 400 are similar to those of the sensor 100 of FIG. 1, except as otherwise described below. As shown in FIG. 4, the sensor 400 includes the second wavefront sensor 460 as well as a beamsplitter 425. The operation of the sensor 400 differs from the operation of the sensor 100 of FIG. 1 in that when the illumination beam is output from the collimation adjustment element 130, a portion of the light is directed by the additional beam splitter 425 to be input to the second wavefront sensor 460. Otherwise, the basic operation of the illumination focus spot and the detection spots on the wavefront sensor 160 are as previously described It will be appreciated that because the input to additional beam splitter 425 and the wavefront sensor 460 comes directly from the collimation adjustment element 130, the portion of the illumination beam that is received is unaffected by such factors as the surface height, surface properties, etc. Therefore, it can be utilized to precisely determine the amount of collimation adjustment that has been made by the collimation adjustment 130 element in order to make the illumination focus height match the surface height (corresponding to FD=0).

In the sensor 400, a precise collimation adjustment measurement provided by the second wavefront sensor 460 is used, instead of the collimation adjustment element control signal CAS (used in the sensor 100), in order to determine the height of the surface that is currently being measured. Using this technique, precise surface height measurements (e.g. in the micron or submicron range) may be provided even when the relationship between $\Delta Z_0$ and CAS is not stable over time, or is affected by temperature, or the like.

In the embodiment shown in FIG. 4, the wavefront sensor 460 is illustrated to be a Shack-Hartmann sensor similar to the previously described wavefront sensor 160, and includes lenses LA1 and LA2, and a photo detector 462 with a data and control line 465. The photodetector 462 may be of any of the types previously described with reference to the photodetector 162. In one embodiment, the lenses LA1 and LA2 may be micro-lenses. The lenses LA1 and LA2 each focus the light input from the beam splitter 425, the input light having a wavefront schematically represented by the wavefront WFA in FIG. 4. The lenses LA1 and LA2 produces images that provide respective detection spots DSA1 and DSA2 which are shown on the surface of the photo detector 462. The distance of the detection spot DSA1 from a reference position RPA is indicated by the distance SCA1, while the distance of the detection spot DSA2 from the reference position RPA is indicated by the distance SCA2. The difference between the distances SCA1 and SCA2 is indicated by the distance $\Delta SCA$.

In the discussion that follows it is convenient to define reference positions $SCA1_0$ and $SCA2_0$, which correspond to the positions of the detection spots DSA1 and DSA2 (that is, the location of their centroids) behind the two detector lenses LA1 and LA2, when the beam output from the collimation adjustment element 130 is fully collimated. The difference between the reference positions $SCA1_0$ and $SCA2_0$ is designated $\Delta SCA_0$.

However, it should be appreciated that in the general case the wavefront sensor 460 senses the adjustment provided by the collimation adjustment element 130, and the outputs from the wavefront sensor 460 are generally not at their reference or null values. Stated another way, the adjustment provided by the collimation adjustment element 130 generally causes the light that is input to the wavefront sensor 460 to have a wavefront WFA that is curved, as shown in FIG. 4. According to the Shack-Hartmann sensor configuration, as shown in FIG. 4, the detection spots DSA1 and DSA2 that result from a curved wavefront are not centered behind the lenses LA1 and LA2. In particular, the deviation of locations SCA1 and SCA2 of the detection spots DSA1 and DSA2 from their reference positions reference positions $SCA1_0$ and $SCA2_0$ can provide an accurate indication of any collimation adjustment provided by the collimation adjustment element 130.

It should be appreciated that using the output(s) of the wavefront sensor 460, a calibration curve similar to the graph 300 of FIG. 3 could be produced, with the exception that the horizontal axis would instead be indicated by the measurement $\Delta SCA$, as opposed to the change in the collimation adjustment control signal CAS. In other words, for the surface height and focus sensor 400 of FIG. 4, the height of the workpiece surface can be precisely determined based on a measurement of the difference $\Delta SCA$ between the positions of the detection spots DSA1 and DSA2, provided that the collimation adjustment element 130 has been adjusted such that the illumination spot is focused at the workpiece surface height, as indicated by a null output from the wavefront sensor 160.

Equations that are analogous to EQUATIONS 1-6 can be formulated corresponding to the operation of the sensor 400. More specifically, for the second wavefront sensor 460, the detection spot DSA1 and DSA2 positions corresponding to the two lenses LA1 and LA2 are given by the expressions:

$$SCA1 = SCA1_0 + k(ACA)$$

$$SCA2 = SCA2_0 - k(ACA) \quad \text{(Eqs. 7, 8)}$$

where $SCA1_0$ and $SCA2_0$ correspond to the positions of the detection spots DSA1 and DSA2 (that is, the location of their centroids) behind the two detector lenses LA1 and LA2, when the beam output from the collimation adjustment element 130 is collimated. The function k is a function of the actual collimation adjustment ACA provided by the collimation adjustment element 130, as sensed from the resulting beam. The deviation from the nominal distance between the detection spot positions SCA1 and SCA2 is given by the expression:

$$\Delta SCA = SCA1 - SCA2 = \Delta SCA_0 + 2k(ACA) \quad \text{(Eq. 9)}$$

If desired, the actual collimation adjustment ACA is readily deduced from the determined value of $\Delta SCA$, provided that the function k(ACA) is known by calibration or analysis. It will be appreciated that $\Delta Z_0$ (CAS) as shown in FIG. 2 is actually a result of the actual collimation adjustment (ACA) that results from the collimation adjustment signal CAS. That is, FIG. 2 implicitly assumes that the actual collimation adjustment ACA is a stable function of the collimation adjustment signal CAS. If this is not the case, or if the control signal CAS does not provide adequate measurement resolution, then $\Delta Z_0$ still depends on the actual collimation adjustment ACA, and may be determined from the measurement $\Delta SCA$, which is a measurement directly corresponding to the actual collimation adjustment ACA (as indicated by EQUATION 9).

Thus, when the configuration of FIG. 4 is used, and for the situation in which FD=0 (as indicated by $\Delta SN = \Delta SN_0$ at the first detector 160), in a manner analogous to EQUATION 3:

$$Z_s = Z_0 + \Delta Z_0(\Delta SCA) \quad \text{(Eq. 10)}$$

It will be appreciated that the present invention may be utilized for a number of applications. In one embodiment, the invention is utilized to determine the height variations (e.g. over a range on the order of a few millimeters) of a workpiece surface with a desired level of accuracy and resolution (e.g. at a micron or sub-micron level). In another embodiment, the height measurements may be utilized as a basis for moving a camera relative to the workpiece surface in order to support a focus operation that provides the camera with a clear image of the surface.

With regard to the level of resolution that may be achieved by a wavefront sensor, by utilizing lenses with longer focal lengths, the resolution is generally better than it is with lenses which have shorter focal lengths. However, lenses with shorter focal lengths may provide a greater operating range. It will be appreciated that these factors influence the selection of the lenses for a wavefront sensor, such that it may provide desired range and/or resolution characteristics for a surface focus or height sensor according to this invention.

In one embodiment, the wavefront sensors 160 and 460 are aligned along the optical axis of the system, including the optical axis of the collimation adjustment element 130. However, it will be appreciated that certain misalignments are tolerable. In one embodiment a wavefront sensor may be more generally configured or aligned, such that a curved wavefront provides an output that is used as a null output. In other embodiments, the illumination beam that is input to the collimation adjustment element 130 need not be perfectly collimated and/or the collimation adjustment element 130 need not be perfectly aligned on the optical axis of the system, for the system to operate accurately with suitable calibration or characterization of the relationship between $\Delta Z_0$ and the signal(s) that is/are used to indicate the collimation adjustment.

It will be appreciated that in some embodiments, the objective lens 145 may have chromatic dispersion, in which case if infrared wavelengths are used to provide the illumination focus spot, its focus position may be different than the focus position that is desirable for visible wavelengths that provide a conventional camera image. The difference between the focus positions may be characterized, and treated as a measurement offset factor for motion control of surface height calculations, if needed.

It will be appreciated that in certain embodiments, either of the wavefront sensors 160 or 460 may be operated with a different number of lenses than outlined above. For example, as outlined above the location of each respective detection spot associated with each respective lens in a wavefront sensor(s) depends on the input wavefront curvature. While measuring the difference between two detection spot locations, as outlined above, may be advantageous for reducing the system sensitivity to certain common mode errors or for performing various types of calibration or error-reduction operations, it is not necessary in all embodiments. Thus, in various embodiments, a single lens may be utilized in one or all of the wavefront sensors outlined above.

More generally, it will be appreciated that the illustrated configuration of the wavefront sensors 160 and 460 are exemplary only and not limiting. In one alternative embodiment of a Shack-Hartmann sensor, the input wavefront may be directed to a beam splitter or a prism, such that the input wavefront is duplicated along two separate optical paths (e.g. in an "L" or a "T" configuration), and the two lenses may be aligned along the separate optical paths. Even more generally, any wavefront sensor that can sense wavefront curvature and/or provide an output that depends on the degree of collimation of an input beam with the desired accuracy, may be used in place of the wavefront sensors 160 and 460.

While the embodiments illustrated and described herein use an adjustable collimation element to gain certain advantages, even if such an element is excluded, certain advantages may still be retained by using a wavefront curvature sensor in the described configuration, particularly in a precision machine vision inspection system. In some applications, such a configuration may still provide one or more signals that indicate a difference between the location of the illumination focus height and the location of a proximate portion of the workpiece surface, and the indicated difference may be used as a basis for focusing an imaging system that includes the objective lens 145 and/or for determining a height coordinate of the proximate portion of the workpiece surface. For some applications, if the wavefront curvature sensor signal variation(s) is (are) calibrated for a particular type of surface property, then a height coordinate for surface having that type of surface property may be determined from its output(s) with sufficient accuracy, at least for some range of measurements surrounding the null condition.

Figure 5:
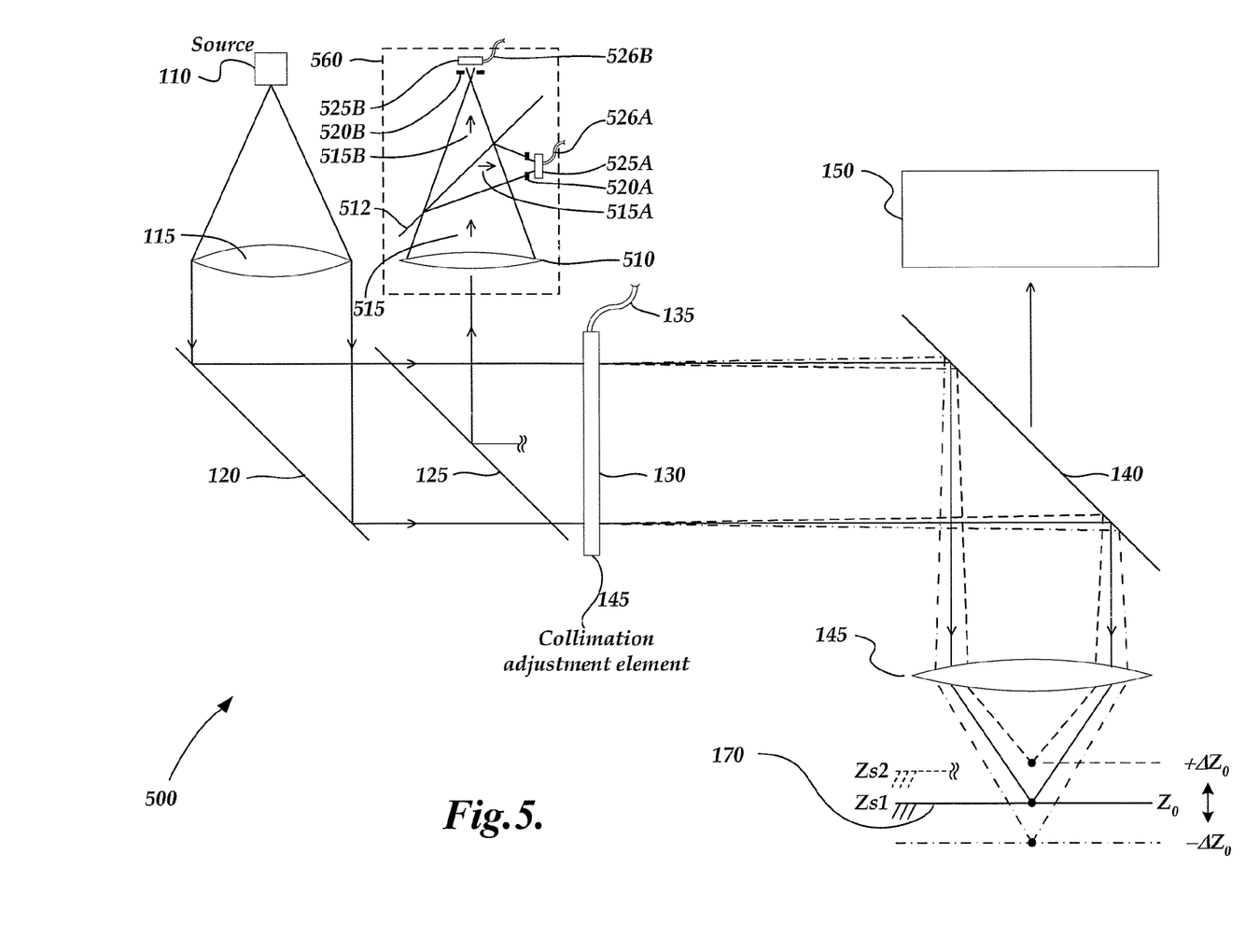
FIG. 5 is a diagram of a third embodiment of a surface height and focus sensor which utilizes a collimation adjustment element and an illumination focus sensor that is an axial focus location sensor.

FIG. 5 is a diagram of a third embodiment of a surface height and focus sensor 500, formed in accordance with the present invention. The operation of the surface height and focus sensor 500 is similar to that of the sensor 100 of FIG. 1 and similarly numbered components may be similar or identical. However, in the surface height and focus sensor 500, the illumination focus sensor is an axial focus location sensor 560, instead of the wavefront sensor 160 that was used in the embodiment shown in FIG. 1. In general, an axial focus location sensor, as the term is used herein, may be described as inputting a focus detection light beam to a lens and providing a signal that depends on where the lens focuses the light beam along an optical axis relative to a spatial filtering element located approximately along the optical axis. The spatial filter element may be a pinhole or a knife edge or the like, in various known types of axial focus location sensors.

In the embodiment shown in FIG. 5, the axial focus location sensor 560 is a differential signal type sensor that may include a lens 510, a beamsplitter 512, a first pinhole aperture 520A and detector 525A, and a second pinhole aperture 520B and detector 525B. In operation the lens 510 inputs an illumination focus detection light beam from the beamsplitter 125 and transmits it as a focused light beam 515 toward the beamsplitter 512, which splits it into first and second measurement beams 515A and 515B. As illustrated in FIG. 5, the first aperture 520A may be placed at a location that has an optical path length to the lens 510 that is slightly less than the nominal focal length of the lens 510, and the second aperture 520B may be located to have a slightly longer optical path length. Thus, as illustrated in FIG. 5, when the second measurement beam 515B focuses approximately at the second aperture 520B the second photodetector 525B will receive all of the energy in the second measurement beam 515B and output a second detector signal on a signal line 526B that has a maximum value. At the same time, the focus point of the first measurement beam 515A will be beyond the optical path length to the first aperture 520A. Therefore, the first aperture 520A will occlude a portion of the first measurement beam 515A and the first photodetector 525A will output a first detector signal on a signal line 526A that has a lower value than the second detector signal on the signal line 526B. In general, the difference between the two detector signals will vary in dependence both upon the difference in height between the illumination focus spot and the workpiece surface and upon the optical surface properties of a workpiece surface, in a manner analogous to that described above with reference to the signals of the wavefront sensor 160. Various considerations related to the signals from the axial focus location sensor 560 are described in greater detail below with reference to FIG. 8.

Figure 6:
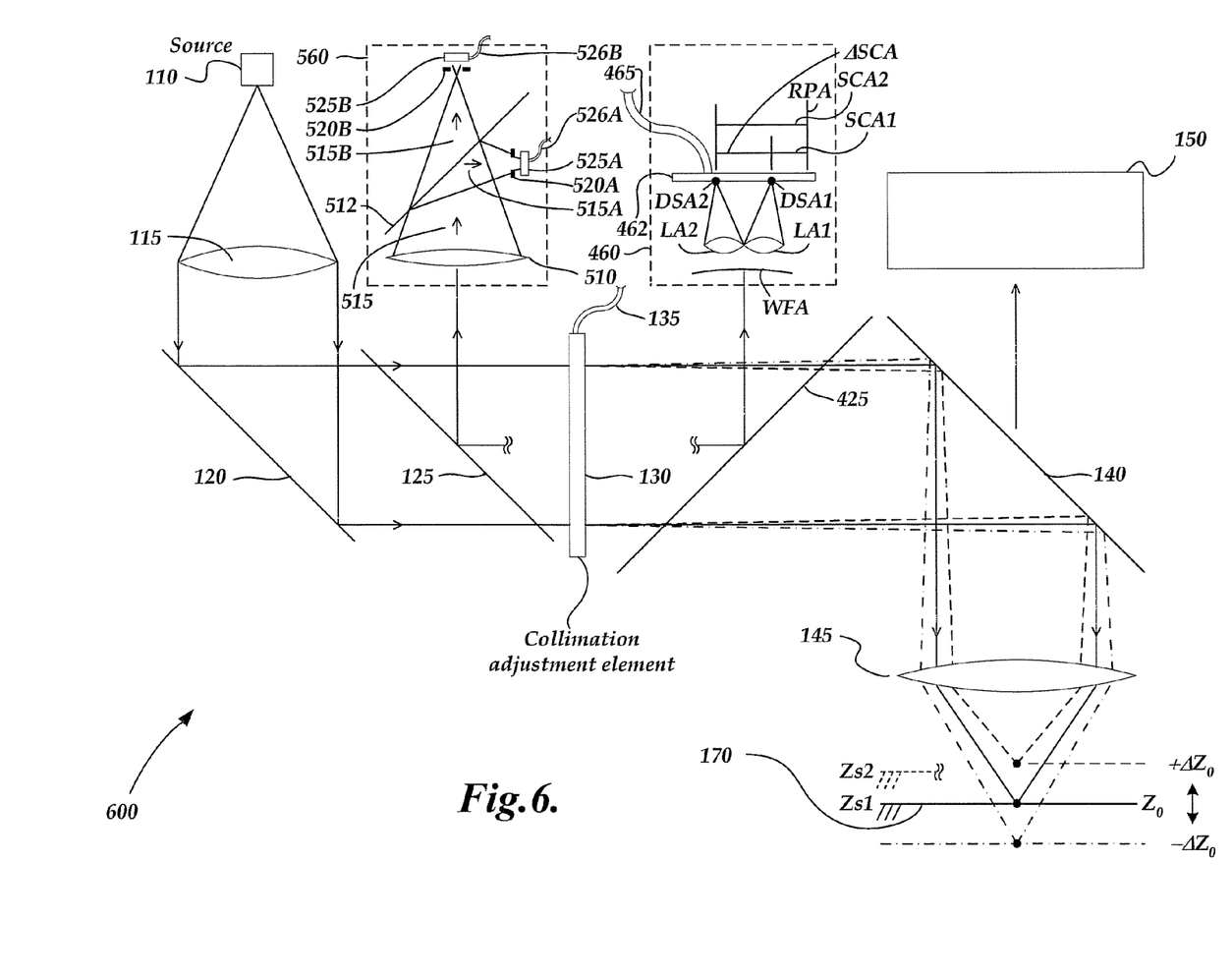
FIG. 6 is a diagram of a fourth embodiment of a surface height and focus sensor which includes an illumination focus sensor that is an axial focus location sensor and a collimation adjustment sensor that is a wavefront sensor that can precisely sense an amount of collimation adjustment.

FIG. 6 is a diagram of a fourth embodiment of a surface height and focus sensor 600, formed in accordance with the present invention. The operation of the sensor 600 is similar to that of the sensor 400 of FIG. 4, and similarly numbered components may be similar or identical. However, in the surface height and focus sensor 600, the illumination focus sensor is the axial focus location sensor 560 previously described with reference to FIG. 5, instead of the wavefront sensor 160 that was used in the embodiment shown in FIG. 4. The operation of the sensor 600 may be understood based on the previous description of similarly configured elements.

Figure 7:
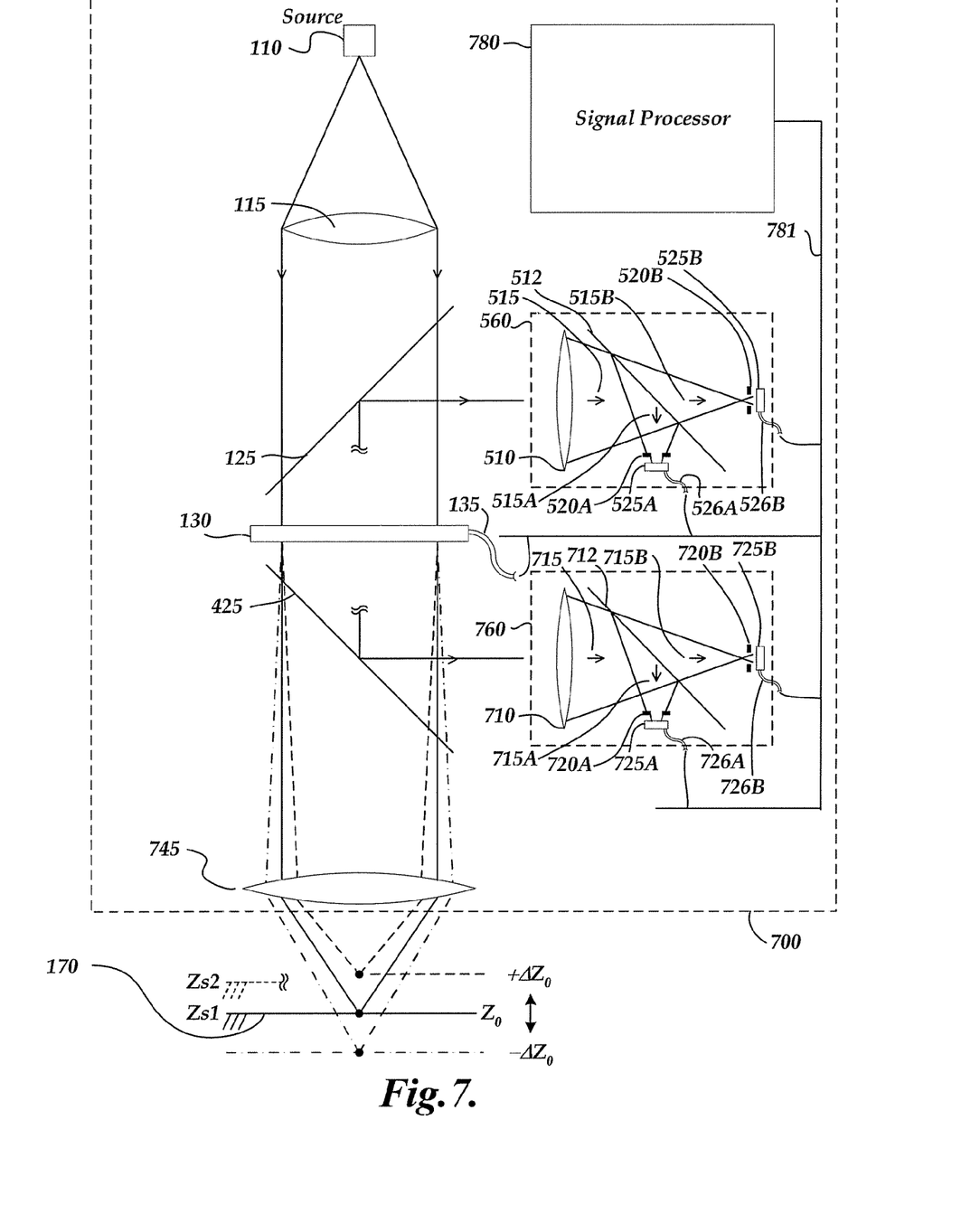
FIG. 7 is a diagram of a fifth embodiment of a surface height and focus sensor which is a stand alone sensor that utilizes a collimation adjustment element and two axial focus location sensors.

FIG. 7 is a diagram of a fifth embodiment of a surface height and focus sensor 700, formed in accordance with the present invention. The operation of the sensor 700 is similar to that of the sensor 600 of FIG. 6, and similarly numbered components may be similar or identical. However, the surface height and focus sensor 700 is a stand alone or accessory surface height and focus sensor. Therefore, it eliminates the camera 150 that was included the sensor 600, and also includes an objective lens 745 rather than the objective lens 145 that also provided images to the camera 150 in the sensor 600. Furthermore, the collimation adjustment sensor is an axial focus location sensor 760 instead of the wavefront sensor 460 that was used in the embodiment shown in FIG. 6. In various embodiments, the components and operation of the axial focus location sensor 760 are similar to those of the axial focus location sensor 560 of FIG. 5, except the differential output signal from the axial focus location sensor 760 is used to determine the amount of collimation adjustment provided by the collimation adjustment element, in a manner analogous to that previously outlined with reference to the output of the wavefront sensor 460 of FIG. 4. The sensor 700 also includes a signal processing and control unit 780 connected to various elements by a power, signal and control bus 781. The signal processing and control unit 780 may input various detector signals, output various control signals, and determine and/or output surface height or focus position information according to previously described principles. Otherwise, the operation of the sensor 700 may be understood based on the previous description of similarly configured elements.

The selection of either a wavefront sensor or an axial focus location sensor for the illumination focus sensor, or the collimation adjustment sensor, may be determined based on the cost and performance constraints of a particular application. In various embodiments, a wavefront sensor may provide better range/resolution performance than an axial focus location sensor, or provide an output that is less sensitive to workpiece surface properties and/or workpiece surface tilt relative to the optical axis of the objective lens. Thus, in various embodiments it may be advantageous to use a wavefront sensor for the illumination focus sensor even if a controllable collimation adjustment element is not included.

However, in various embodiments according to this invention, adequate performance may be provided by an axial focus location sensor.

Figure 8:
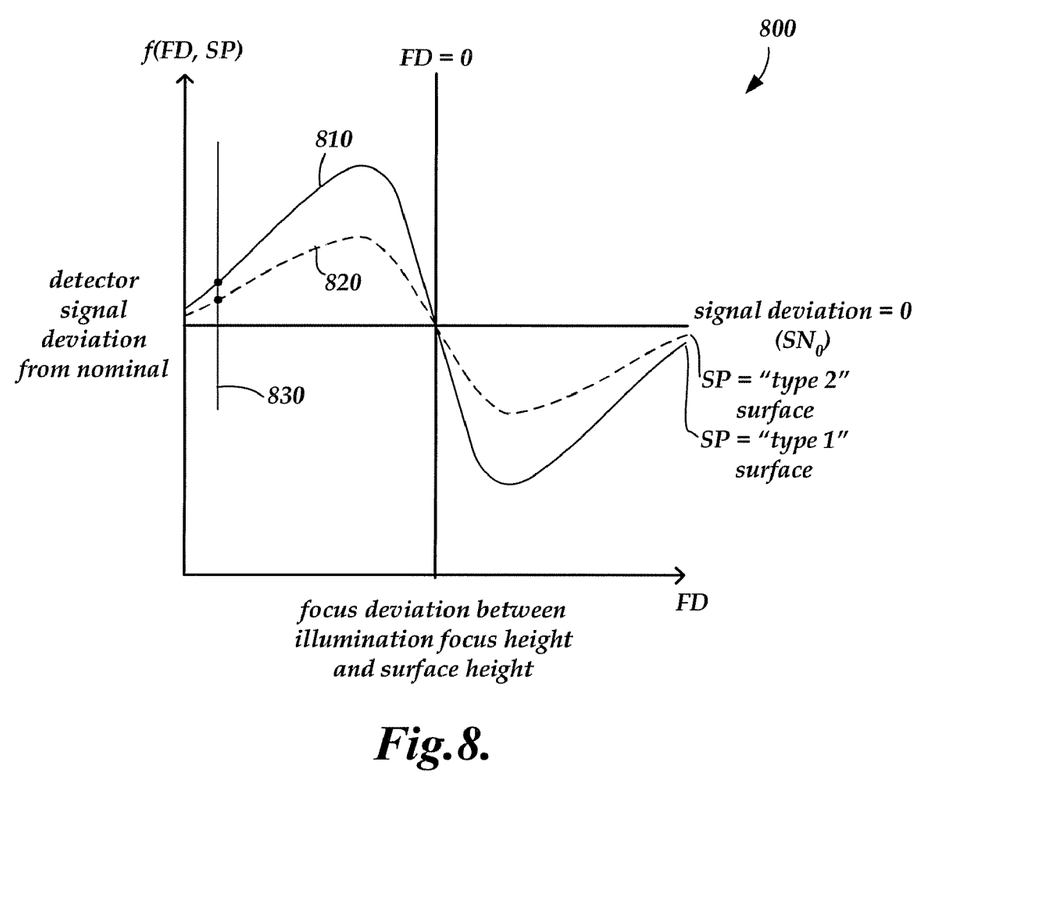
FIG. 8 is a graph illustrating differential signals output from an axial focus location sensor which vary in accordance with both height and surface properties of a workpiece surface.

FIG. 8 is a graph 800 illustrating differential signal curves 810 and 820 output from an axial focus location sensor. In one embodiment, each of the curves 810 and 820 may correspond to variations in the difference between the first and second detector signals on the signal lines 526A and 526B of the axial focus location sensor 560 as the difference in height between the illumination focus spot and the workpiece surface is varied. The curves 810 and 820 are different, for example at the focus deviation amount corresponding to the line 830, due to the different optical surface properties SP (e.g. specular, diffuse, etc.) in a manner analogous to that previously described with reference to FIG. 2. In various embodiments, it may be convenient to locate the first and second apertures 520A and 520B of the axial focus location sensor 560 such that the difference between the first and second detector signals on the signal lines 526A and 526B is zero (the null condition) when the illumination focus height matches the height of the workpiece surface 170. In such a case, as shown in FIG. 8, when the illumination spot is focused at the workpiece surface height, the detection spot deviation curves represented by lines 810 and 820 coincide. Thus, in various embodiments when an axial focus location sensor is used as an illumination focus sensor according to this invention, when its signal output corresponds to the null condition, the workpiece surface is at $Z_0$, regardless of the surface properties of the workpiece surface 170. Thus, in various embodiments according to this invention, as a basis for measuring the height of the workpiece surface, the collimation adjustment element 130 is adjusted such that this condition is fulfilled. The resulting surface height measurement is nominally independent of the workpiece surface optical properties. As described previously with respect to FIG. 3, a measurement of the change in the collimation adjustment element 130 required to make the illumination focus height match the surface height may provide an indication of the change $\Delta Z_0$ in the illumination focus height relative to its nominal position $Z_0$. Thus, that same measurement can be utilized as a measurement of the workpiece surface variation from the position $Z_0$, and the measurement will be nominally independent of the optical surface properties SP of the surface being measured, as outlined above.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for operating a surface height sensing system for detecting a location of a portion of a workpiece surface along a direction approximately parallel to the optical axis of an objective lens, the method comprising:

outputting a workpiece illuminating beam from a light source;

providing the workpiece illumination beam with a controllable degree of collimation;

inputting light from the workpiece illuminating beam having the controllable degree of collimation to the objective lens;

outputting the light from the workpiece illuminating beam from the objective lens such that it is focused at an illumination focus height near a proximate portion of the workpiece surface;

inputting reflected workpiece illuminating beam light from the workpiece surface to the objective lens, and transmitting the reflected light through the objective lens to provide a focus-detection light beam;

inputting the focus detection light beam to a wavefront sensor, and operating the wavefront sensor to sample at least two local ray angles at separated regions along a wavefront of the input focus detection light beam to provide at least two output signals that depend on a characteristic of the input focus detection light beam that depends at least partially on a difference between a location of the illumination focus height along the direction approximately parallel to the optical axis of an objective lens and a location of the proximate portion of the workpiece surface along the direction approximately parallel to the optical axis of an objective lens; and performing operations that detect the location of the proximate portion of the workpiece surface along a direction approximately parallel to the optical axis of the objective lens based at least partially on the at least two output signals provided by the wavefront sensor, wherein:

the operations that detect the location of the proximate portion of the workpiece surface comprise adjusting the controllable degree of collimation provided to the workpiece illumination beam until the at least two output signals from the wavefront sensor correspond to the location of the illumination focus height approximately coinciding with the location of the proximate portion of the workpiece surface.

2. The method of claim 1, wherein adjusting the controllable degree of collimation comprises inputting the workpiece illuminating beam to a controllable collimation adjustment element and adjusting the controllable collimation adjustment element to provide the adjusted degree of collimation.

3. The method of claim 2, further comprising directing the focus detection light beam from the objective lens along a reversed path through the controllable collimation adjustment element before inputting the focus detection light beam to the wavefront sensor.

4. The method of claim 2, wherein the operations that detect the location of the proximate portion of the workpiece surface further comprise characterizing an amount of collimation adjustment provided by the controllable collimation adjustment element when the at least two output signals provided by the wavefront sensor correspond to the location of the illumination focus height approximately coinciding with the location of the proximate portion of the workpiece surface.

5. The method of claim 4, wherein the amount of collimation adjustment is characterized based on a control signal that controls the controllable collimation adjustment element.

6. The method of claim 4, further comprising:

splitting the workpiece illuminating beam having the adjusted controllable degree of collimation before inputting its light to the objective lens; and inputting a split portion of the workpiece illuminating beam having the adjusted controllable degree of collimation to a collimation adjustment sensor that outputs at least one output signal that varies in a manner that depends on the amount of collimation adjustment provided by the controllable collimation adjustment element, wherein:

the amount of collimation adjustment is characterized based on the at least one output signal from the collimation adjustment sensor.

7. The method of claim 2, wherein adjusting the controllable collimation adjustment element comprises deforming a member of the controllable collimation adjustment element without otherwise changing its nominal position.

8. The method of claim 7, wherein the collimation adjustment element comprises an electronically controllable variable focus lens.

9. The method of claim 1, wherein the wavefront sensor comprises a Shack-Hartmann sensor.

10. The method of claim 1, wherein:

the objective lens is used for providing conventional workpiece inspection images in a precision machine vision inspection system, the precision machine vision inspection system comprising an imaging system including the objective lens and a camera configured for providing the conventional workpiece inspection images;

the proximate portion of the workpiece surface is positioned in the field of view of the imaging system; and at least one precision machine vision inspection system inspection operation is performed based at least partially on the detected location, wherein that at least one inspection operation comprises at least one of the steps of: (a) determining a height coordinate of the proximate portion of the workpiece surface, and (b) adjusting the precision machine vision inspection system such that the imaging system is focused at the location of the proximate portion of the workpiece surface.

11. The method of claim 10, wherein:

the step of providing the workpiece illumination beam with a controllable degree of collimation comprises inputting the workpiece illuminating beam to a controllable collimation adjustment element and adjusting the controllable collimation adjustment element to provide an adjusted degree of collimation; and at least one instance of determining a height coordinate of the proximate portion of the workpiece surface is performed without performing step (b).

12. The method of claim 10, wherein at least one instance of adjusting the precision machine vision inspection system such that the imaging system is focused at the location of the proximate portion of the workpiece surface is performed without performing step (a).

13. A sensor for detecting a location of a portion of a workpiece surface along a direction approximately parallel to the optical axis of an objective lens, the sensor comprising:

a light source for outputting a workpiece illuminating beam;

a controllable collimation adjustment element that inputs the workpiece illuminating beam and outputs a workpiece illuminating beam having an adjusted degree of collimation;

the objective lens, which inputs light from the workpiece illuminating beam having the adjusted degree of collimation light, and outputs the light such that it is focused at an illumination focus height near a proximate portion of the workpiece surface, and receives reflected workpiece illuminating beam light from the workpiece surface and transmits the reflected light to provide a focus-detection light beam;

a wavefront sensor that receives the focus-detection light beam and provides at least two output signals that depend at least partially on a difference between a location of the illumination focus height along the direction approximately parallel to the optical axis of an objective lens and a location of the proximate portion of the workpiece surface along the direction approximately parallel to the optical axis of an objective lens;

a signal processing and control portion that performs operations that detect the location of the proximate portion of the workpiece surface along a direction approximately parallel to the optical axis of the objective lens based at least partially on the at least two output signals provided by the wavefront sensor;

a collimation adjustment sensor; and a beam splitter arranged to split the workpiece illuminating beam having the adjusted degree of collimation before inputting its light to the objective lens and input a split portion of the workpiece illuminating beam having the adjusted degree of collimation to the collimation adjustment sensor, wherein:

the collimation adjustment sensor outputs at least one output signal that varies in a manner that depends on the amount of collimation adjustment provided by the controllable collimation adjustment element; and the signal processing and control portion that performs operations that detect the location of the proximate portion of the workpiece surface along a direction approximately parallel to the optical axis of the objective lens based on a value of the at least one output of the collimation adjustment sensor that corresponds to a null condition of the at least two output signals from the wavefront sensor, the null condition corresponding to the location of the illumination focus height approximately coinciding with the location of the proximate portion of the workpiece surface.

14. The sensor of claim 13, wherein the controllable collimation adjustment element further receives the focus detection light beam from the objective lens along a reversed path through the controllable collimation adjustment element, before inputting the focus detection light beam to the wavefront sensor.

15. The sensor of claim 13, wherein the signal processing and control portion is configured to:

output a signal that controls the controllable collimation adjustment element to provide an amount of collimation adjustment such that the at least two output signals from the wavefront sensor indicate the null condition;

determine a characterization of the amount of collimation adjustment corresponding to the null condition, based on the at least one output signal of the collimation adjustment sensor; and determine a difference between the location of the proximate portion and a reference location, based on the characterization of the amount of collimation adjustment corresponding to the null condition, wherein a difference between the characterization of the amount of collimation adjustment corresponding to the null condition and a characterization corresponding to a reference amount of collimation adjustment is indicative of a difference between the location of the proximate portion and a reference location that corresponds to an illumination focus height that is provided by the reference amount of collimation adjustment.

* * * * *